(12) United States Patent
Zhu et al.

(10) Patent No.: US 11,881,961 B2
(45) Date of Patent: Jan. 23, 2024

(54) COMMUNICATION METHOD AND RELATED APPARATUS

(71) Applicant: Huawei Technologies Co., Ltd., Shenzhen (CN)

(72) Inventors: Hualin Zhu, Shanghai (CN); Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/733,840

(22) Filed: Apr. 29, 2022

(65) Prior Publication Data
US 2022/0263674 A1     Aug. 18, 2022

Related U.S. Application Data

(63) Continuation of application No. PCT/CN2019/114752, filed on Oct. 31, 2019.

(51) Int. Cl.
*H04L 12/18*     (2006.01)
*H04L 67/146*     (2022.01)

(52) U.S. Cl.
CPC .......... *H04L 12/185* (2013.01); *H04L 67/146* (2013.01); *H04L 12/189* (2013.01)

(58) Field of Classification Search
CPC ... H04L 12/185; H04L 12/189; H04L 67/146; H04L 61/5014; H04L 67/142; H04L 67/148; H04L 67/303; H04W 12/37
See application file for complete search history.

(56) References Cited

U.S. PATENT DOCUMENTS

2016/0112345 A1* 4/2016 Na .................. H04W 76/40
370/329

FOREIGN PATENT DOCUMENTS

| CN | 109673060 A | 4/2019 |
| CN | 109769150 A | 5/2019 |

(Continued)

OTHER PUBLICATIONS

"3rd Generation Partnership Project; Technical Specification Group Services and System Aspects; Wireless and wireline convergence access support for the 5G System (5GS) (Release 16)," 3GPP TS 23.316 V16.1.0, total 75 pages, 3rd Generation Partnership Project, Valbonne, France (Sep. 2019).

*Primary Examiner* — Zhensheng Zhang
(74) *Attorney, Agent, or Firm* — Leydig, Voit & Mayer, Ltd.

(57) ABSTRACT

This application discloses a communication method and a related apparatus. The communication method includes: A first core network element receives a first message from a second core network element, where the first message includes identification information of a first terminal and first identification information of a session, and the session indicated by the first identification information is used by a second terminal to transmit data for the first terminal; the first core network element obtains, based on the identification information of the first terminal, terminal context information corresponding to the session; and the first core network element sends a second message to the second core network element, where the second message includes the terminal context information corresponding to the session. This can directly control session permission of a terminal device, thereby improving accuracy of performing permission control on the terminal device.

20 Claims, 8 Drawing Sheets

(56) References Cited

FOREIGN PATENT DOCUMENTS

| | | | | |
|---|---|---|---|---|
| CN | 110086839 | A | 8/2019 | |
| CN | 110366011 | A | 10/2019 | |
| EP | 3876589 | A1 * | 9/2021 | ............ H04W 28/16 |
| WO | 2019136128 | A1 | 7/2019 | |

* cited by examiner

COMMUNICATION METHOD AND RELATED APPARATUS

CROSS-REFERENCE TO RELATED APPLICATION

This application is a continuation of International Application No. PCT/CN2019/114752, filed on Oct. 31, 2019. The disclosure of the aforementioned application is hereby incorporated by reference in its entirety.

TECHNICAL FIELD

Embodiments of this application relate to the field of communication technologies, and in particular, to a communication method and a related apparatus.

BACKGROUND

In conventional technology, multicast data of a set-top box is transmitted through a session established between a residential gateway and a mobile network. Because permission control needs to be performed on the multicast data, in an existing permission control solution, permission control is performed only on the residential gateway, resulting in low accuracy of performing permission control on the multicast data.

SUMMARY

Embodiments of this application provide a communication method and a related apparatus, to directly control session permission of a terminal device, thereby improving accuracy of performing permission control on the terminal device.

According to a first aspect, an embodiment of this application provides a communication method. The method includes:

A first core network element receives a first message from a second core network element, where the first message includes identification information of a first terminal and first identification information of a session, and the session indicated by the first identification information is used by a second terminal to transmit data for the first terminal;

the first core network element obtains, based on the identification information of the first terminal, terminal context information corresponding to the session; and the first core network element sends a second message to the second core network element, where the second message includes the terminal context information corresponding to the session.

In the foregoing embodiment, after receiving the first message from the second core network element, the first core network element obtains, based on the identification information of the first terminal included in the message, the terminal context information corresponding to the session indicated by the first identification information, and sends the terminal context information to the second core network element based on the second message, so that the second core network element can directly obtain the terminal context information corresponding to the session used by the second terminal to transmit data for the first terminal. This can implement permission control on the first terminal, thereby improving accuracy of performing permission control on the first terminal.

With reference to the first aspect, in a possible implementation of the first aspect, the second message further includes second identification information of the session. The second identification information of the session may be the same as or different from the first identification information. The first identification information may be any identifier that identifies the session, including any one piece of information that identifies the session, such as a PDU session identifier, an N4 session identifier, an IP address assigned to a PDU session, and a policy association identifier (Policy Association ID). The second identification information may be any identifier that identifies the session, including any one piece of information that identifies the session, such as a PDU session identifier, an N4 session identifier, an IP address assigned to a PDU session, and a policy association identifier (Policy Association ID).

With reference to the first aspect, in a possible implementation of the first aspect, the method further includes:

The first core network element receives, from a data network, a unified data management network element, or a unified database, terminal context information corresponding to a plurality of terminals.

The data network includes an interactive personality television network, an IP multimedia system network, the Internet, or another private network.

That the first core network element obtains, based on the identification information of the first terminal, terminal context information corresponding to the session includes:

The first core network element obtains, based on the identification information of the first terminal, the terminal context information corresponding to the session from the terminal context information corresponding to the plurality of terminals.

In this example, the terminal context information corresponding to the plurality of terminals may be received from the data network, the unified data management network element, or the unified database, and may be stored, and the terminal context information corresponding to the session is obtained from the terminal context information corresponding to the plurality of terminals. The terminal context information corresponding to the session is directly obtained from the stored terminal context information corresponding to the plurality of the terminals, without a need to obtain the terminal context information from the data network, the unified data management network element, or the unified database each time the first message is received. Therefore, efficiency of obtaining the terminal context information corresponding to the session indicated by the first identification information can be improved.

With reference to the first aspect, in a possible implementation of the first aspect, that the first core network element obtains, based on the identification information of the first terminal, terminal context information corresponding to the session includes:

The first core network element sends a third message to a unified data management network element or a unified database, where the third message includes the identification information of the first terminal; and the first core network element receives a fourth message from the unified data management network element or the unified database, where the fourth message includes the terminal context information corresponding to the session.

In this example, the third message is sent to the unified data management network element or the unified database, where the third message includes the identification information of the first terminal, and the terminal context information is obtained from the unified data management network element or the unified database. Therefore, the terminal context information can be obtained from a trusted third party, so that security and reliability of obtaining the terminal context information can be improved.

With reference to the first aspect, in a possible implementation of the first aspect, the terminal context information includes at least one of the following information corresponding to the first terminal: multicast permission information, quality of service information, and policy information.

With reference to the first aspect, in a possible implementation of the first aspect, the multicast permission information includes permission used by the first terminal to obtain multicast channel data. The permission used by the first terminal to obtain the multicast channel data is used to indicate whether the first terminal can obtain multicast data on a multicast channel.

With reference to the first aspect, in a possible implementation of the first aspect, the first core network element includes a policy control network element, and the second core network element includes a session management function.

With reference to the first aspect, in a possible implementation of the first aspect, the first core network element may further include a unified data management network element or a unified database.

With reference to the first aspect, in a possible implementation of the first aspect, the first terminal includes a set-top box, and the second terminal includes user equipment or a residential gateway.

With reference to the first aspect, in a possible implementation of the first aspect, that the session is used by a second terminal to transmit data for the first terminal includes: The session is a session used by the first terminal to transmit data via the second terminal.

According to a second aspect, an embodiment of this application provides a communication method. The method includes:

A second core network element sends a first message to a first core network element, where the first message includes identification information of a first terminal and first identification information of a session, and the session indicated by the first identification information is used by a second terminal to transmit data for the first terminal;

the second core network element receives a second message from the first core network element, where the second message includes terminal context information corresponding to the session; and the second core network element sends a fifth message to a third core network element, where the fifth message includes the terminal context information corresponding to the session, and the fifth message is used to indicate the third core network element to manage the session based on the terminal context information corresponding to the session.

In the foregoing embodiment, after receiving the second message, the second core network element sends a third message to the third core network element, where the third message includes the terminal context information, and indicates the third core network element to manage the session based on the terminal context information corresponding to the session. This can directly manage a session of a terminal, thereby improving reliability and accuracy of managing the session of the terminal.

With reference to the second aspect, in a possible implementation of the second aspect, the second core network element receives a session message from the second terminal, where the session message includes the identification information of the first terminal; or the second core network element receives a dynamic host configuration protocol message, where the dynamic host configuration protocol message includes the identification information of the first terminal.

With reference to the second aspect, in a possible implementation of the second aspect, the terminal context information includes at least one of the following information corresponding to the first terminal: multicast permission information, quality of service information, and policy information.

In this example, the identification information of the first terminal can be obtained from the session message from the second terminal or the dynamic host configuration protocol message. This can obtain the identification information of the first terminal based on signaling or a message, thereby diversifying manners of obtaining the identification information of the first terminal.

With reference to the second aspect, in a possible implementation of the second aspect, the multicast permission information includes permission used by the first terminal to obtain multicast channel data.

With reference to the second aspect, in a possible implementation of the second aspect, the first core network element includes a policy control network element, the second core network element includes a session management function, and the third core network element includes a user plane function.

With reference to the second aspect, in a possible implementation of the second aspect, the first core network element may further include a unified data management network element or a unified database.

With reference to the second aspect, in a possible implementation of the second aspect, that the session is used by a second terminal to transmit data for the first terminal includes: The session is a session used by the first terminal to transmit data via the second terminal.

According to a third aspect, an embodiment of this application provides a network apparatus. The apparatus includes:

a receiving unit, configured to receive a first message from a second core network element, where the first message includes identification information of a first terminal and first identification information of a session, and the session indicated by the first identification information is used by a second terminal to transmit data for the first terminal;

a processing unit, configured to obtain, based on the identification information of the first terminal, terminal context information corresponding to the session; and a sending unit, configured to send a second message to the second core network element, where the second message includes the terminal context information corresponding to the session.

With reference to the third aspect, in a possible implementation of the third aspect, the second message further includes second identification information of the session. The second identification information of the session may be the same as or different from the first identification information. The first identification information may be any identifier that identifies the session, including any one piece of information that identifies the session, such as a PDU session identifier, an N4 session identifier, an IP address assigned to a PDU session, and a policy association identifier (Policy Association ID). The second identification information may be any identifier that identifies the session, including any one piece of information that identifies the session, such as a PDU session identifier, an N4 session identifier, an IP address assigned to a PDU session, and a policy association identifier (Policy Association ID).

With reference to the third aspect, in a possible implementation of the third aspect, the receiving unit is further configured to:
receive, from a data network, a unified data management network element, or a unified database, terminal context information corresponding to a plurality of terminals. The data network includes an interactive personality television network, an IP multimedia system network, the Internet, or another private network.

The processing unit is configured to:
obtain, based on the identification information of the first terminal, the terminal context information corresponding to the session from the terminal context information corresponding to the plurality of terminals.

With reference to the third aspect, in a possible implementation of the third aspect, the processing unit is configured to:
send a third message to a unified data management network element or a unified database, where the third message includes the identification information of the first terminal; and
receive a fourth message from the unified data management network element or the unified database, where the fourth message includes the terminal context information corresponding to the session.

With reference to the third aspect, in a possible implementation of the third aspect, the terminal context information includes at least one of the following information corresponding to the first terminal: multicast permission information, quality of service information, and policy information.

With reference to the third aspect, in a possible implementation of the third aspect, the multicast permission information includes permission used by the first terminal to obtain multicast channel data. The permission used by the first terminal to obtain the multicast channel data is used to indicate whether the first terminal can obtain multicast data on a multicast channel.

With reference to the third aspect, in a possible implementation of the third aspect, the first core network element includes a policy control network element, and the second core network element includes a session management function.

With reference to the third aspect, in a possible implementation of the third aspect, the first core network element may further include a unified data management network element or a unified database.

With reference to the third aspect, in a possible implementation of the third aspect, the first terminal includes a set-top box, and the second terminal includes user equipment or a residential gateway.

With reference to the third aspect, in a possible implementation of the third aspect, that the session is used by a second terminal to transmit data for the first terminal includes: The session is a session used by the first terminal to transmit data via the second terminal.

According to a fourth aspect, an embodiment of this application provides a network apparatus. The apparatus includes:

a sending unit, configured to send a first message to a first core network element, where the first message includes identification information of a first terminal and first identification information, and a session indicated by the first identification information is used by a second terminal to transmit data for the first terminal; and
a receiving unit, configured to receive a second message from the first core network element, where the second message includes terminal context information corresponding to the session.

The sending unit is configured to send a fifth message to a third core network element, where the fifth message includes the terminal context information corresponding to the session, and the fifth message is used to indicate the third core network element to manage the session based on the terminal context information corresponding to the session.

With reference to the fourth aspect, in a possible implementation of the fourth aspect, the receiving unit is further configured to:
receive a session message from the second terminal, where the session message includes the identification information of the first terminal; or
receive a dynamic host configuration protocol message, where the dynamic host configuration protocol message includes the identification information of the first terminal.

With reference to the fourth aspect, in a possible implementation of the fourth aspect, the terminal context information includes at least one of the following information corresponding to the first terminal: multicast permission information, quality of service information, and policy information.

With reference to the fourth aspect, in a possible implementation of the fourth aspect, the multicast permission information includes permission used by the first terminal to obtain multicast channel data.

With reference to the fourth aspect, in a possible implementation of the fourth aspect, the first core network element includes a policy control network element, the second core network element includes a session management function, and the third core network element includes a user plane function.

With reference to the fourth aspect, in a possible implementation of the fourth aspect, the first core network element may further include a unified data management network element or a unified database.

With reference to the fourth aspect, in a possible implementation of the fourth aspect, that the session is used by a second terminal to transmit data for the first terminal includes: The session is a session used by the first terminal to transmit data via the second terminal.

According to a fifth aspect, an embodiment of this application provides a communication system, where the communication system includes the network apparatus according to the third aspect and the network apparatus according to the fourth aspect.

According to a sixth aspect, an embodiment of this application provides a computer-readable storage medium. The computer-readable storage medium stores a computer program. The computer program includes program instructions. When the program instructions are executed by a processor, the processor is enabled to perform a part or all of the method according to the first aspect or the second aspect.

According to a seventh aspect, an embodiment of this application provides a communication apparatus, including a processor and a memory.

The memory is configured to store computer program instructions, and the processor is configured to execute the computer program instructions, to implement a part or all of the method according to the first aspect.

According to an eighth aspect, an embodiment of this application provides a communication apparatus, including a processor and a memory.

The memory is configured to store computer program instructions, and the processor is configured to execute the computer program instructions, to implement a part or all of the method according to the second aspect.

According to a ninth aspect, an embodiment of this application provides a chip system. The chip system includes a processor, configured to support a network apparatus in implementing a part or all of the method according to the first aspect or the second aspect.

The aspects or other aspects of this application are clearer and more comprehensible in the following descriptions of embodiments.

DESCRIPTION OF EMBODIMENTS

The following describes embodiments of this application with reference to the accompanying drawings.

Figure 1:
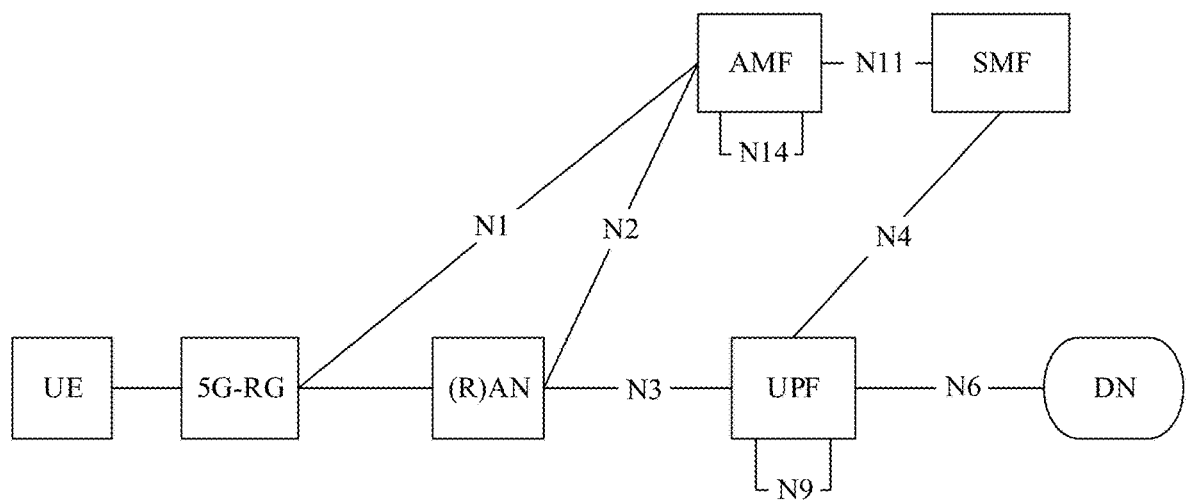
FIG. 1 is a schematic diagram of an architecture of a communication system according to an embodiment of this application.

To better understand a communication method provided in embodiments of this application, the following first briefly describes a system to which the communication method is applied. FIG. 1 is a schematic diagram of an architecture of a communication system according to an embodiment of this application. The system architecture shown in FIG. 1 not only supports access to a core network (CN) through a radio access technology (such as long term evolution (LTE), a 5G RAN (5G radio access network, 5G access network), and a next-generation radio access network (NG RAN) in a universal mobile communication technology) defined by the 3rd Generation Partnership Project (3GPP) standard group, but also supports access to the core network through a non-3GPP access technology via a non-3GPP interworking function (N3IWF) or a next-generation packet data gateway (ngPDG). As shown in FIG. 1, the system architecture further supports access through a fixed network/wireline network. For example, a 5G residential gateway (5G RG)/CPE accesses the core network through a wireline 5G access network (W-5GAN). In a scenario in which the 5G residential gateway accesses a 5G core (5GC) through the wireline 5G access network, 5GC capable user equipment (5GC capable UE) may access the 5GC through the 5G residential gateway. In this case, the 5GC capable user equipment is a remote device, and the 5G residential gateway is a relay device. Certainly, the 5G residential gateway may alternatively access the system architecture in a wireless manner.

The network architecture of this application is not limited to the 5G network architecture, and any network including a multicast permission management function is applicable to this application. A network in the network architecture may be a private network, a long term evolution LTE network, a MulteFire network, a home base station network, a non-3GPP mobile network such as a Wi-Fi mobile access network, a global system for mobile communications GSM network, a GPRS network, a wideband code division multiple access WCDMA network, a future 6G network, or the like. An access network AN in the network may be an NG RAN, or may be an AGF, a BNG, or a wireline AN connected to a fixed network, a private access network, a MulteFire access network, an untrusted access N3IWF (Non-3GPP Interworking Function), or a trusted access gateway.

As shown in FIG. 1, the system architecture may include 5G core (5GC) capable user equipment, a 5G RG, an NG RAN device, a W-5GAN device, and a core network device.

The 5GC capable user equipment (5GC capable UE) is user equipment (user equipment, UE) capable of accessing the 5G core (5GC) defined by the 3GPP. The 5GC capable user equipment may access the core network through the NG RAN or the 5G-RG. The 5GC capable user equipment may be a handheld terminal, a subscriber unit, a cellular phone, a smartphone, a machine type communication (MTC) terminal device, or the like. The 5GC capable user equipment may alternatively be a wireless data card, a personal digital assistant (PDA) computer, a tablet computer, a wireless modem, a handheld device (handheld), a laptop computer, a cordless phone, a wireless local loop (WLL), or another device that can access a network. In addition to the 5GC capable user equipment, the system architecture may further support access, to the core network, of a terminal device having only a 3GPP-defined radio access capability, and may further support access, to the core network, of a terminal device (for example, a tablet computer) having only a non-3GPP-defined access capability.

The 5G-RG is a residential gateway that can access the 5GC through the W-5G AN. In this application, the 5G-RG may further support the 5GC capable user equipment in accessing the 5GC through the 5G-RG. The residential gateway is the core of an entire home network, and is mainly used for internet access, connection between different subnets in the home network, remote control and management, and the like.

The NG RAN device is a RAN device and is mainly responsible for functions such as radio resource management, quality of service (QoS) management, data compression and encryption, and the like on an air interface side. In addition to the NG RAN device, the system architecture may further support another 3GPP-defined radio access network device, for example, a 5G RAN device. The RAN device may include a macro base station, a micro base station (also referred to as a small cell), a relay station, or the like. In systems using different radio access technologies, devices having a base station function may have different names. For example, in a 5th generation (5G) system, the device is referred to as a gNB; in an LTE system, the device is referred to as an evolved NodeB (eNB or eNodeB); and in a 3rd generation (3G) system, the device is referred to as a NodeB.

As shown in FIG. 1, the core network device may include a UPF, an AMF, an SMF, and the like. These core network devices constitute the 5GC, and the 5GC can support a 3GPP access network and a non-3GPP access network.

The user plane function (UPF) is responsible for packet forwarding and receiving. The UPF network element may receive user data from a data network, and transmit the user data to a terminal device through an access network device. Further, the UPF network element may receive user data from the terminal device through the access network device, and forward the user data to the data network. A transmission resource and a scheduling function on the UPF network element that serve the terminal device are managed and controlled by the SMF network element. The UPF network element may buffer a data packet.

The access and mobility management function (AMF) network element is a core network element and is mainly responsible for signaling processing such as access control, mobility management, attachment, detachment, and gateway selection. When providing a service for a session of the terminal device, the AMF network element provides a control plane storage resource for the session, to store a session identifier, an SMF network element identifier associated with the session identifier, and the like.

The session management function (SMF) is responsible for user plane network element selection, user plane network element redirection, internet protocol (IP) address assignment, QoS control, and establishment, modification, and release of a data transmission channel. The SMF network element may buffer a data packet.

In addition, the system architecture further includes a data network (data network, DN). The DN is a network that includes an application function and that provides an application data server for the terminal device.

A unified data management (UDM) network element: Unified data management includes two parts: an application front end (FE) and a unified data repository (UDR) network element. The FE can access subscriber information stored in the UDR. The FE supports authentication information processing, subscriber identity processing, access authorization, subscription management, SMS message management, and the like. The UDR is a storage server for user subscription data and provides a subscription data storage service.

A policy control function (PCF) network element mainly provides a unified policy framework for controlling network behavior and provides a policy rule to a control layer device and a terminal device for offering policy information. In addition, the PCF network element is responsible for obtaining user subscription information related to policy decision.

To simplify the accompanying drawings, a unified data repository (UDR) network element and a network exposure function (NEF) network element in the core network are not shown.

Names of the devices (such as the 5G capable UE, the 5G-RG, and the W-5G AN) in the system architecture shown in FIG. 1 may change in a future communication standard, but this does not affect applicability of the technical solutions provided in this application.

The system architecture shown in FIG. 1 is merely intended to describe the technical solutions in this application more clearly, but constitute no limitation on this application. A person of ordinary skill in the art may know that, with evolution of the network architecture and emergence of a new service scenario, the technical solutions provided in this application are also applicable to a similar technical problem.

In embodiments of this application, a first terminal may be any terminal that obtains a service via a second terminal, for example, a set-top box, an electronic key, or an identity card, and the second terminal may be any device that can access a mobile network, for example, a mobile phone, a computer, a residential gateway, or a car.

This application is described by using a set-top box as an example. Certainly, this application is not only applicable to the set-top box, but also applicable to any device that needs to perform multicast permission management.

In this application, a first core network element includes a policy control network element, a second core network element includes a session management function, a unified data management network element, or a unified database, a first terminal includes a set-top box or the like, and a second terminal includes user equipment, a residential gateway, or the like.

Figure 2:
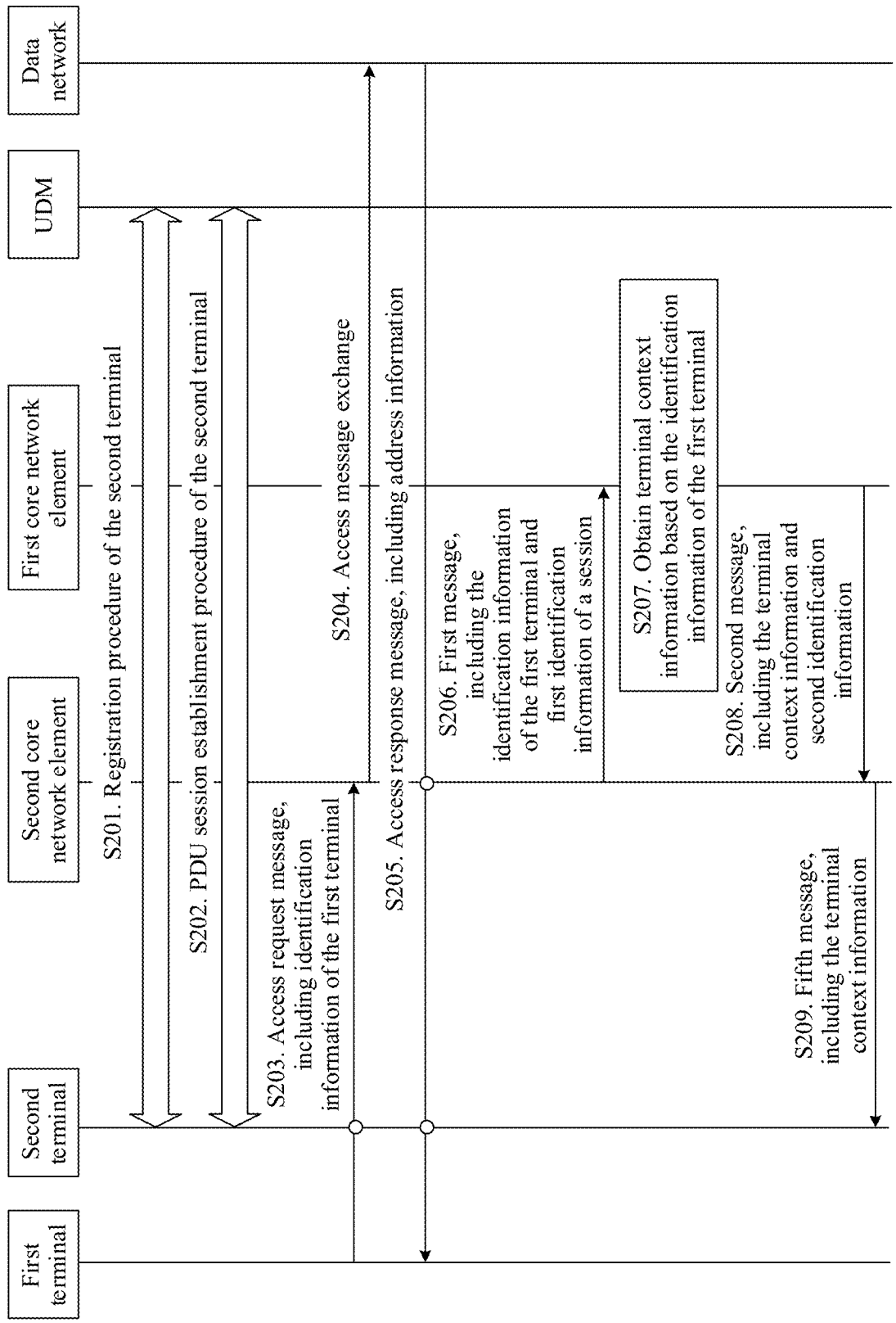
FIG. 2 is a schematic flowchart of a communication method according to an embodiment of this application.

FIG. 2 is a schematic flowchart of a communication method according to an embodiment of this application. As shown in FIG. 2, the communication method includes steps S201 to S209. Details are as follows:

S201. A second terminal completes a procedure of registering with a mobile network.

For a specific procedure in which the second terminal registers with the mobile network, refer to a specific registration manner in an existing solution. Details are not described herein. For example, the mobile network may be a 5G network, or the mobile network may be a private network, a long term evolution LTE network, a MulteFire network, a home base station network, a non-3GPP mobile network such as a Wi-Fi mobile access network, a global system for mobile communications GSM network, a GPRS network, a wideband code division multiple access WCDMA network, a future 6G network, or the like. An access network AN in the mobile network may be an NG RAN, or may be an AGF, a BNG, or a wireline AN connected to a fixed network, a private access network, a MulteFire access network, an untrusted access N3IWF (Non-3GPP Interworking Function), or a trusted access gateway.

S202. The second terminal establishes a PDU session with the mobile network.

For a specific operation of establishing a protocol data unit session (PDU session) with the mobile network by the second terminal, refer to a specific PDU session establishment manner in an existing solution. Details are not described herein. After the PDU session is established, the session may be used to obtain service data of a data network, which may specifically include multicast data and the like.

S203. A first terminal sends an access request message to a second core network element, where the access request message includes identification information of the first terminal.

The access request message may be sent based on a dynamic host configuration protocol (DHCP) message. When sending the access request message to the second core network element, the first terminal sends a DHCP access message to the second core network element through forwarding by the second terminal. The identification information of the first terminal is any terminal identifier of the first terminal, for example, may be an equipment identity, a physical device address, a user name, a VLAN ID, or an IP address assigned to the terminal. The first terminal may be, for example, any device connected to the second terminal, such as a set-top box, a mobile phone device, a television, a computer, an electronic key, or an identity card. The second terminal may be, for example, user equipment, a car, a residential gateway, a computer, a mobile phone, or a Wi-Fi device.

S204. The second core network element and the data network complete exchange of an access message of the first terminal.

The second core network element and the data network complete exchange of the DHCP access message of the first terminal, so that the first terminal accesses the data network. The data network includes an interactive personality television network (IPTV network), an IP multimedia system network (IMS network), the Internet, or another private network.

S205. The data network sends an access response message to the first terminal, where the access response message includes address information.

The data network may send the access response message to the first terminal through forwarding by the second core network element or the second terminal. The address information included in the access response message may be, for example, an IP address.

S206. The second core network element sends a first message to a first core network element, where the first message includes the identification information of the first terminal and first identification information of the session.

The second core network element sends the first message to the first core network element, where the first message includes the identification information of the first terminal and the first identification information of the session, and is used to request terminal context information corresponding to the session indicated by the first identification information. The session indicated by the first identification information is used by the second terminal to transmit data for the first terminal, and may be understood as a session through which the first terminal transmits data via the second terminal.

The first identification information may include an identifier of a session that is associated with the first terminal and that is established by the second terminal. The associated session may be, for example, a session for multicast data transmission, and may be specifically understood as the PDU session that is between the second terminal and the data network and that is established by the second terminal for the first terminal in step S202. The session associated with the first terminal and established by the second terminal may be used to transmit data of the first terminal, or may be used to transmit data corresponding to the first terminal. The data of the first terminal may be, for example, multicast data, and the transmitted data corresponding to the first terminal may be, for example, policy information corresponding to a session. The first identification information may be any identifier that identifies the session, including at least one piece of information that identifies the session, such as a PDU session identifier, an N4 session identifier, an IP address assigned to a PDU session, and a policy association identifier (Policy Association ID).

The terminal context information includes at least one of the following information corresponding to the first terminal: multicast permission information, quality of service information, and policy information. The multicast permission information, the quality of service information, and the policy information are used to control multicast permission of the first terminal.

S207. The first core network element obtains, based on the identification information of the first terminal, the terminal context information corresponding to the session indicated by the first identification information.

The first core network element may store a mapping relationship between identification information of a terminal and terminal context information corresponding to a session indicated by the identification information, and may obtain, based on the mapping relationship, the terminal context information corresponding to the session indicated by the first identification information.

The first core network element may alternatively obtain, from terminal context information corresponding to a plurality of terminals, the terminal context information corresponding to the session indicated by the first identification information. The terminal context information corresponding to the plurality of terminals may be terminal context information that is corresponding to a plurality of terminals and that is received from the data network, a unified data management network element, or a unified database.

The first core network element may alternatively obtain, from another core network element, the terminal context information corresponding to the session indicated by the first identification information. The another core network element may be, for example, a unified data management network element or a unified database.

S208. The first core network element sends a second message to the second core network element, where the second message includes the terminal context information and second identification information.

The second identification information may include an identifier of a session that is associated with the first terminal and that is established by the second terminal. The associated session may be, for example, a session for multicast data transmission, and may be specifically understood as the PDU session that is between the second terminal and the data network and that is established by the second terminal for the first terminal in step S202. The session associated with the first terminal and established by the second terminal may be used to transmit data of the first terminal, or may be used to transmit data corresponding to the first terminal. The data of the first terminal may be, for example, multicast data, and the transmitted data corresponding to the first terminal may be, for example, policy information corresponding to a session.

The second identification information may be at least one identifier that identifies the session, including any one piece of information that identifies the session, such as a PDU session identifier, an N4 session identifier, an IP address assigned to a PDU session, and a policy association identifier (Policy Association ID).

The second identification information and the first identification information may be the same or different.

S209. The second core network element sends a fifth message to a third core network element, where the fifth message includes the terminal context information.

The fifth message is used to indicate the third core network element to manage the session based on the terminal context information corresponding to the session. The management on the session may be, for example, permission management.

In the foregoing embodiment, after receiving the first message from the second core network element, the first core network element obtains, based on the identification information of the first terminal included in the message, the terminal context information corresponding to the session indicated by the first identification information, and sends the terminal context information to the second core network element based on the second message. The second core network element sends the terminal context information to the third core network element, and indicates the third core network element to manage the session based on the terminal context information corresponding to the session. This can directly manage a session of a terminal, thereby improving reliability and accuracy of managing the session of the terminal.

In a possible embodiment, a possible method for obtaining, by the first core network element based on the identification information of the first terminal, the terminal context information corresponding to the session includes:

receiving, from the data network, a unified data management network element, or a unified database, terminal context information corresponding to a plurality of terminals, and storing the plurality of pieces of terminal context information, where each piece of terminal context information in the plurality of pieces of terminal context information corresponds to one terminal identifier. In this case, the terminal context information corresponding to the session indicated by the first identification information may be obtained from the plurality of pieces of terminal context information based on the identification information of the first terminal.

The terminal context information corresponding to the plurality of terminals may be understood as terminal context information corresponding to each of the plurality of terminals.

In a possible embodiment, another possible method for obtaining, by the first core network element based on the identification information of the first terminal, the terminal context information corresponding to the session includes steps A1 and A2. Details are as follows:

A1. The first core network element sends a third message to a unified data management network element or a unified database, where the third message includes the identification information of the first terminal.

A2. The first core network element receives a fourth message from the unified data management network element or the unified database, where the fourth message includes the terminal context information corresponding to the session.

After receiving the third message, the unified data management network element or the unified database obtains, based on the identification information of the first terminal, the terminal context information corresponding to the identification information of the first terminal, and sends the terminal context information to the first core network element based on the fourth message. Therefore, the first core network element may obtain, from the unified data management network element or the unified database, the terminal context information corresponding to the session indicated by the first identification information.

In this example, the first core network element obtains, from a trusted third party (the unified data management network element or the unified database), the terminal context information corresponding to the identification information of the first terminal, so that reliability of obtaining the terminal context information can be improved.

Figure 3:
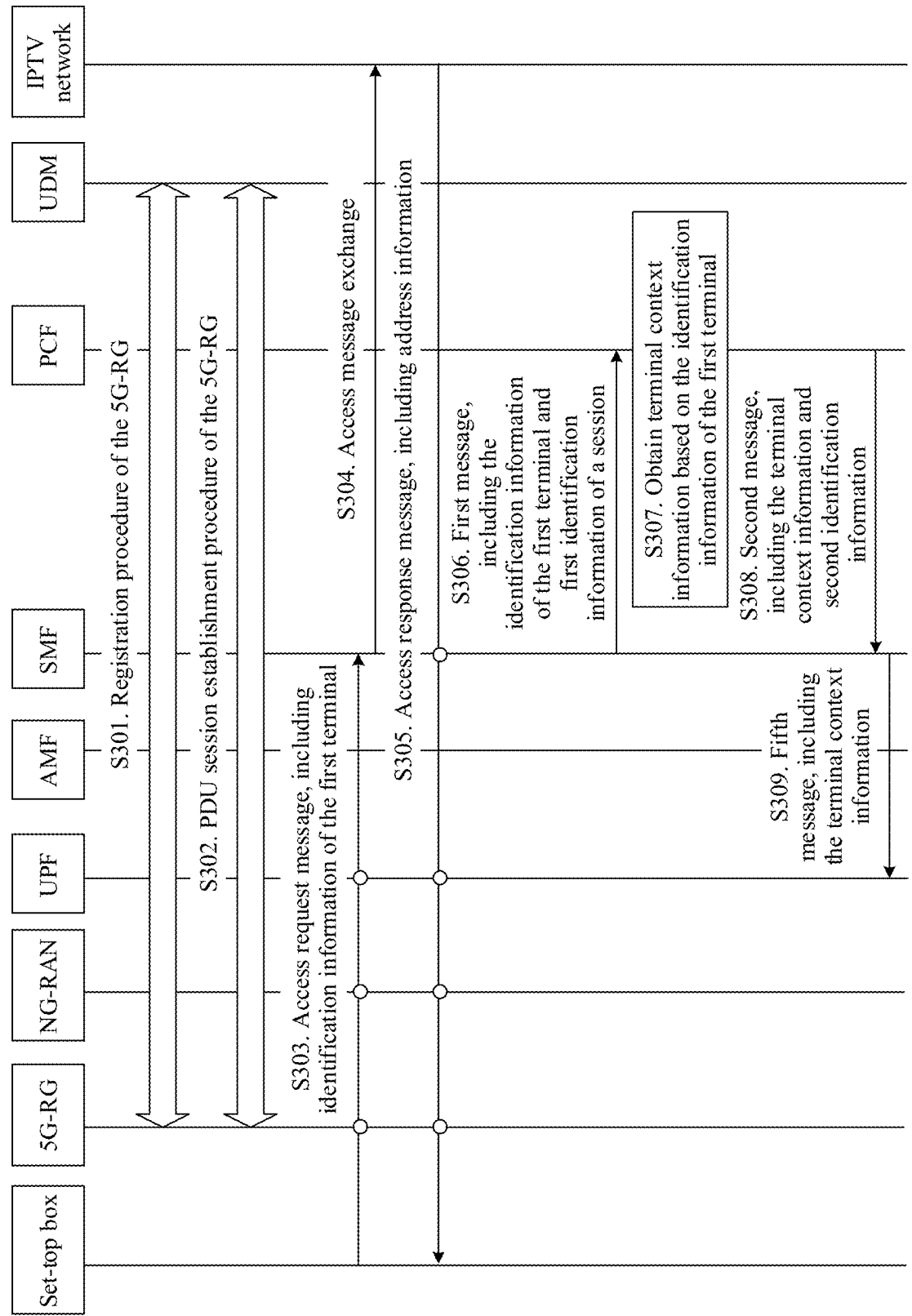
FIG. 3 is a schematic flowchart of another communication method according to an embodiment of this application.

FIG. 3 is a schematic flowchart of another communication method according to an embodiment of this application. As shown in FIG. 3, this embodiment is described by using an example in which a first terminal is a set-top box, a second terminal is a 5G-RG, a first core network element is a PCF, a second core network element is an SMF, a third core network element is a UPF, and a data network is an IPTV network. The communication method includes steps S301 to S309. Details are as follows:

S301. The 5G-RG completes a procedure of registering with a mobile network.

S302. The 5G-RG establishes a PDU session with the mobile network.

After the PDU session is established, the session may be used to obtain service data of the IPTV network, and may specifically include multicast data and the like.

For specific implementations of steps S301 and S302, refer to the specific implementations of steps S201 and S202. Details are not described herein again.

S303. The set-top box sends an access request message to the SMF, where the access request message includes identification information of the first terminal.

The access request message may be sent based on a DHCP message. When sending the access request message to the SMF, the set-top box sends a DHCP access request to the SMF through forwarding by the 5G-RG, the NG-RAN, or the UPF. The identification information of the first terminal is a terminal identifier of the set-top box.

S304. The SMF and the IPTV network complete exchange of an access message of the set-top box.

The SMF and the IPTV network complete exchange of the DHCP access message of the set-top box, so that the set-top box accesses the IPTV network.

S305. The IPTV network sends an access response message to the set-top box, where the access response message includes address information.

When sending the access response message to the set-top box, the IPTV network may send the access response message to the set-top box through forwarding by the SMF, the UPF, the NG-RAN, or the 5G-RG. The address information included in the access response message may be, for example, an IP address.

S306. The SMF sends a first message to the PCF, where the first message includes the identification information of the first terminal and first identification information of a session.

The SMF sends the first message to the PCF, where the first message includes the identification information of the first terminal and the first identification information, and is used to request terminal context information corresponding to the session indicated by the first identification information.

The first identification information may include an identifier of a session that is established by the 5G-RG and that is associated with the set-top box. The associated session may be, for example, a session for multicast data transmission, and may be specifically understood as the PDU session that is between the 5G-RG and the IPTV network and that is established by the 5G-RG for the set-top box in step S202. The session established by the 5G-RG and associated with the set-top box may be used to transmit data of the set-top box, or may be used to transmit data corresponding to the set-top box. The first identification information may be any identifier that identifies the session, including at least one piece of information that identifies the session, such as a PDU session identifier, an N4 session identifier, an IP address assigned to a PDU session, and a policy association identifier (Policy Association ID).

The terminal context information includes at least one of the following information corresponding to the first terminal: multicast permission information, quality of service information, and policy information. The multicast permission information, the quality of service information, and the policy information are used to control multicast permission of the set-top box. The multicast permission information is used to indicate whether the first terminal can obtain multicast data on a multicast channel.

S307. The PCF obtains, based on the identification information of the first terminal, the terminal context information corresponding to the session indicated by the first identification information.

The PCF may store a mapping relationship between identification information of a terminal and terminal context information corresponding to a session indicated by the identification information, and may obtain, based on the mapping relationship, the terminal context information corresponding to the session indicated by the first identification information.

The PCF may alternatively obtain, from terminal context information corresponding to a plurality of terminals, the terminal context information corresponding to the session indicated by the first identification information. The terminal context information corresponding to the plurality of terminals may be terminal context information that is corresponding to a plurality of terminals and that is received from the data network, a unified data management network element, or a unified database.

The PCF may alternatively obtain, from another core network element, the terminal context information corresponding to the session indicated by the first identification information. The another core network element may be, for example, a unified data management network element or a unified database.

For the foregoing manner of obtaining the terminal context information, refer to the specific implementation of obtaining the terminal context information by the first terminal in the foregoing embodiment. Details are not described herein again.

S308. The PCF sends a second message to the SMF, where the second message includes the terminal context information and second identification information.

The second identification information may include an identifier of a session that is established by the 5G-RG and that is associated with the set-top box. The associated session may be, for example, a session for multicast data transmission, and may be specifically understood as the PDU session that is between the 5G-RG and the IPTV network and that is established by the 5G-RG for the set-top box in step S302. The session established by the 5G-RG and associated with the set-top box may be used to transmit data of the set-top box, or may be used to transmit data corresponding to the set-top box. The transmitted data of the set-top box may be, for example, multicast data, and the transmitted data corresponding to the set-top box may be, for example, policy information corresponding to the session. The second identification information includes at least one of the following information that identifies a session: a PDU session identifier, an N4 session identifier, an IP address assigned to the PDU session, a policy association identifier (Policy Association ID), and the like.

The second identification information and the first identification information may be a same identifier, or may be different identifiers.

S309. The SMF sends a fifth message to the UPF, where the fifth message includes the terminal context information.

The fifth message is used to indicate the UPF to manage, based on the terminal context information corresponding to the session, the session indicated by the first identification information. The management on the session may be, for example, permission management.

In this example, the PCF completes the operation of obtaining the terminal context information corresponding to the session indicated by the first identification information, and can directly obtain the terminal context information and send the terminal context information to the UPF. The UPF may perform permission control on the set-top box, thereby improving accuracy of performing permission control on the set-top box.

Figure 4:
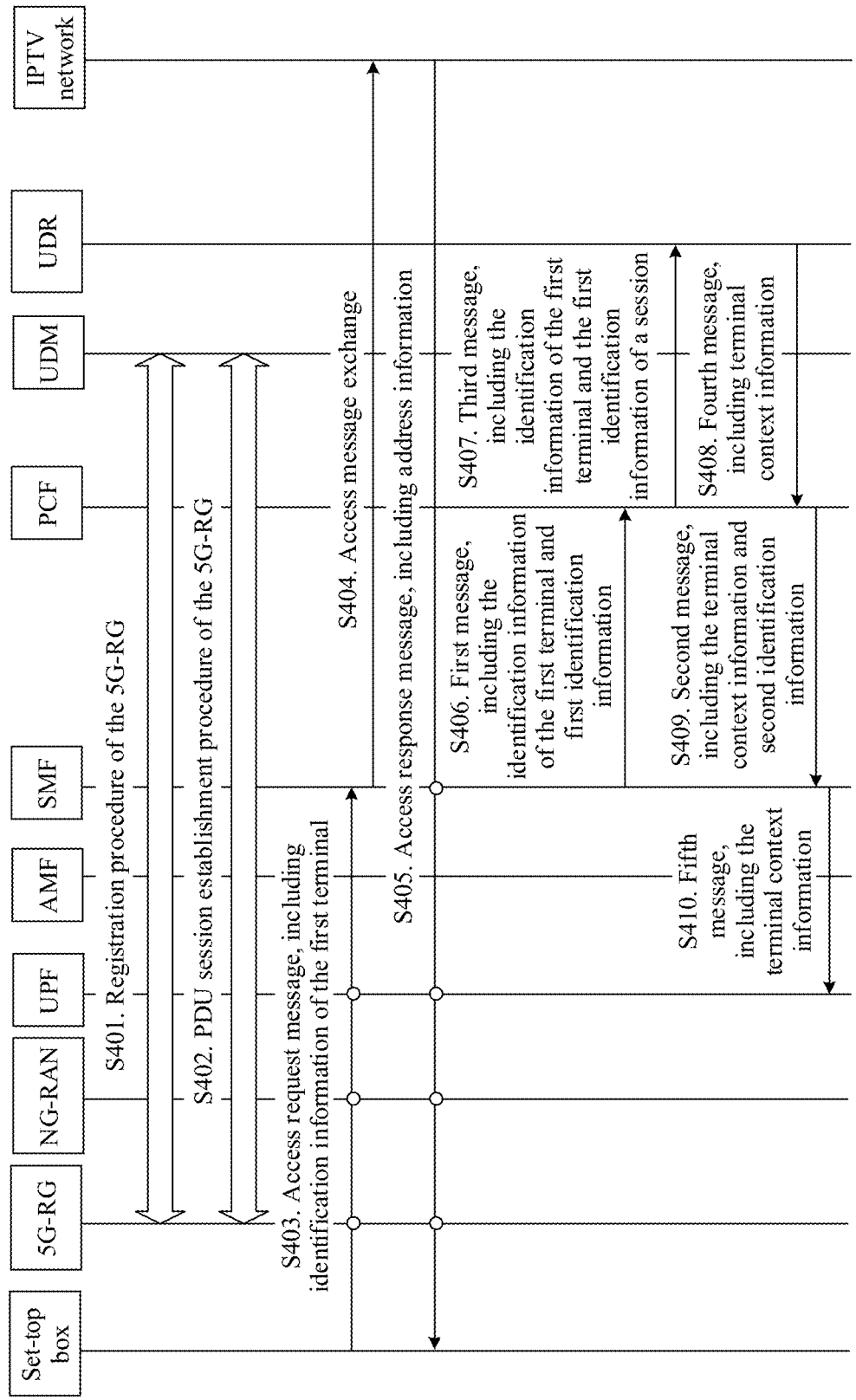
FIG. 4 is a schematic flowchart of another communication method according to an embodiment of this application.

FIG. 4 is a schematic flowchart of another communication method according to an embodiment of this application. As shown in FIG. 4, this embodiment is described by using an example in which a first terminal is a set-top box, a second terminal is a 5G-RG, a first core network element is a PCF, a second core network element is an SMF, a third core network element is a UPF, and a data network is an IPTV network. The communication method includes steps S401 to S409. Details are as follows:

S401. The 5G-RG completes an operation of registering with a mobile network.

S402. The 5G-RG establishes a PDU session with the mobile network.

S403. The set-top box sends an access request message to the SMF, where the access request message includes identification information of the first terminal.

S404. The SMF and the IPTV network complete exchange of an access message of the set-top box.

S405. The IPTV network sends an access response message to the set-top box, where the access response message includes address information.

S406. The SMF sends a first message to the PCF, where the first message includes the identification information of the first terminal and first identification information of a session.

For steps S401 to S406, refer to the specific implementations of steps S301 to S306. Details are not described herein again.

S407. The PCF sends a third message to a UDR, where the third message includes the identification information of the first terminal and the first identification information.

S408. The UDR sends a fourth message to the PCF, where the fourth message includes the terminal context information.

The UDR may store a mapping relationship between identification information of a terminal and terminal context information corresponding to a session indicated by the identification information, and may obtain, based on the mapping relationship, the terminal context information corresponding to the session indicated by the first identification information.

In a possible implementation, the UDR may alternatively obtain, from another network unit, the terminal context information corresponding to the session indicated by the first identification information. The another network unit may be a core network element, or may be another network element. This is not specifically limited herein.

S409. The PCF sends a second message to the SMF, where the second message includes the terminal context information and second identification information.

The second identification information may include an identifier of a session that is established by the 5G-RG and that is associated with the set-top box. The associated session may be, for example, a session for multicast data transmission, and may be specifically understood as the PDU session that is between the 5G-RG and the IPTV network and that is established by the 5G-RG for the set-top box in step S402. The session established by the 5G-RG and associated with the set-top box may be used to transmit data of the set-top box, or may be used to transmit data corresponding to the set-top box. The transmitted data of the set-top box may be, for example, multicast data, and the transmitted data corresponding to the set-top box may be, for example, policy information corresponding to the session.

S410. The SMF sends a fifth message to the UPF, where the fifth message includes the terminal context information.

For steps S409 and S410, refer to the specific implementations of steps S308 and S309. Details are not described herein again.

In this example, after receiving the first message, the PCF sends the third message to the UDR, so that the PCF obtains the terminal context information from the UDR. In this way, the PCF can obtain the terminal context information from a trusted third party (the UDR), thereby improving reliability and security of obtaining the terminal context information.

Figure 5:
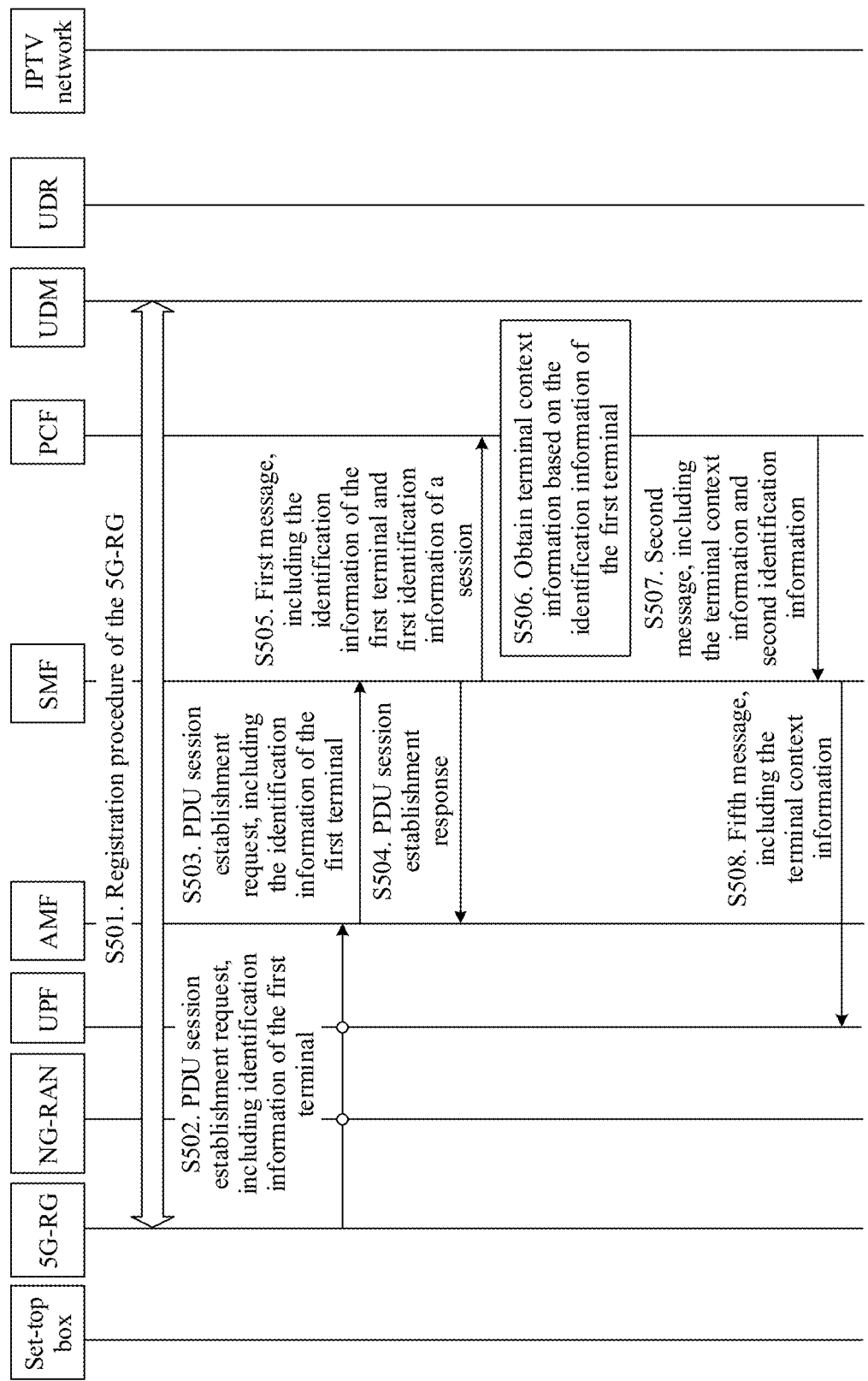
FIG. 5 is a schematic flowchart of another communication method according to an embodiment of this application.

FIG. 5 is a schematic flowchart of another communication method according to an embodiment of this application. As shown in FIG. 5, this embodiment is described by using an example in which a first terminal is a set-top box, a second terminal is a 5G-RG, a first core network element is a PCF, a second core network element is an SMF, a third core network element is a UPF, and a data network is an IPTV network. The communication method includes steps S501 to S509. Details are as follows:

S501. The 5G-RG completes an operation of registering with a mobile network.

S502. The 5G-RG sends a PDU session establishment request to the AMF, where the PDU session establishment request includes identification information of the first terminal.

The 5G-RG may obtain the identification information of the first terminal in advance in another manner. For example, the 5G-RG may obtain the identification information of the first terminal when the first terminal applies for accessing the 5G-RG, or by receiving input identification information of the first terminal. Certainly, the identification information of the first terminal may alternatively be obtained in another manner. This is not specifically limited herein.

S503. The AMF sends a PDU session establishment request to the SMF, where the PDU session establishment request includes identification information of the first terminal.

S504. The SMF sends a PDU session establishment response to an AMF.

S505. The SMF sends a first message to the PCF, where the first message includes the identification information of the first terminal and first identification information of a session.

There is no execution sequence between step S504 and step S505. That is, it may be understood as that step S504 may be performed before step S505, step S504 and step S505 may be performed simultaneously, or step S504 may be performed after step S505.

The first identification information may be an identifier of the PDU session.

S506. The PCF obtains, based on the identification information of the first terminal, the terminal context information corresponding to the session indicated by the first identification information.

S507. The PCF sends a second message to the SMF, where the second message includes the terminal context information and second identification information.

S508. The SMF sends a fifth message to the UPF, where the fifth message includes the terminal context information.

For steps S506 to S508, refer to the specific implementations of steps S307 to S309. Details are not described herein again.

In this example, when the 5G-RG (the second terminal) establishes the PDU session for the first terminal (the set-top box), the PDU session establishment request may include the identification information of the first terminal. After the SMF receives the identification information of the first terminal, the SMF sends the first message to the PCF to obtain the terminal context information. The terminal context information may be obtained when the PDU session is established. In this way, the terminal context information can be obtained before the first terminal sends an access request message to the data network, and efficiency of obtaining the terminal context information can be improved.

Figure 6:
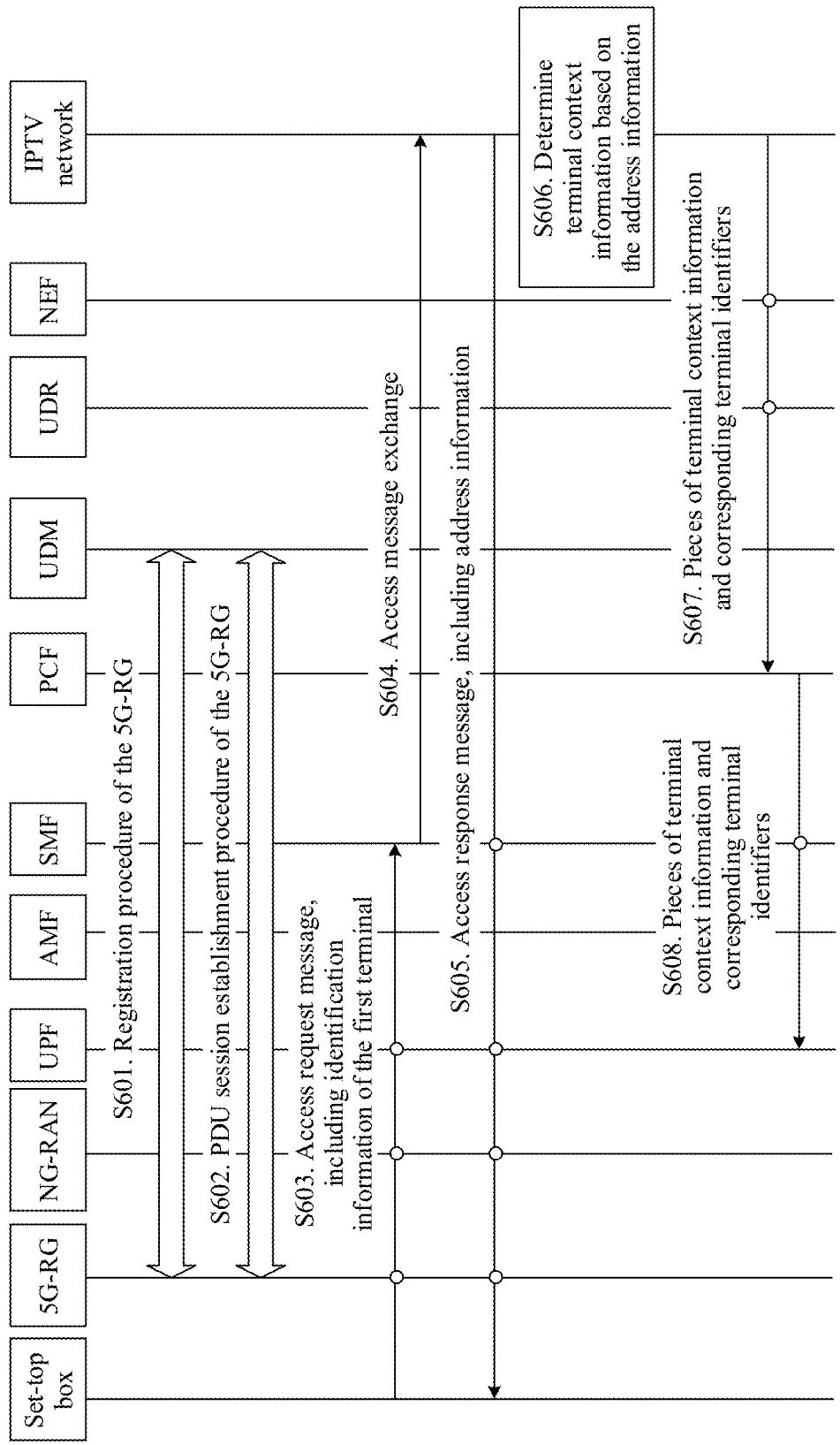
FIG. 6 is a schematic flowchart of another communication method according to an embodiment of this application.

FIG. 6 is a schematic flowchart of another communication method according to an embodiment of this application. As shown in FIG. 6, this embodiment is described by using an example in which a first terminal is a set-top box, a second terminal is a 5G-RG, a first core network element is a PCF, a second core network element is an SMF, a third core network element is a UPF, and a data network is an IPTV network. The communication method includes steps S601 to S608. Details are as follows:

S601. The 5G-RG completes a procedure of registering with a mobile network.

S602. The 5G-RG establishes a PDU session with the mobile network.

S603. The set-top box sends an access request message to the SMF, where the access request message includes identification information of the first terminal.

S604. The SMF and the IPTV network complete exchange of an access message of the set-top box.

S605. The IPTV network sends an access response message to the set-top box, where the access response message includes address information.

For specific implementations of steps S601 to S605, refer to the specific implementations of steps S301 to S305. Details are not described herein again.

S606. The IPTV network determines terminal context information based on the address information.

The IPTV network obtains, based on the address information, the terminal context information that is of the first terminal and that is indicated by the address information. Specifically, for example, the terminal context information may be obtained based on session permission information that is of the first terminal and that is indicated by the address information.

The IPTV network may receive access request messages from a plurality of terminals, to determine terminal context information corresponding to the plurality of terminals.

S607. The IPTV network sends the plurality of pieces of terminal context information and corresponding terminal identifiers to the PCF.

The plurality of pieces of terminal context information are in a one-to-one correspondence with the terminal identifiers. The terminal identifier is the identification information of the first terminal, and there may be a plurality of first terminals herein. The terminal identifier may be understood as terminal identification information.

The IPTV network may send the plurality of pieces of terminal context information and the corresponding terminal identifiers to the PCF through forwarding by an NEF or a UDR.

S608. The PCF sends the plurality of pieces of terminal context information and the corresponding terminal identifiers to the UPF.

After receiving the plurality of pieces of terminal context information and the corresponding terminal identifiers, the UPF performs, based on the plurality of pieces of terminal context information, session management on terminals indicated by the corresponding terminal identifiers.

The PCF may send the plurality of pieces of terminal context information and the corresponding terminal identifiers to the UPF through forwarding by the SMF.

In this example, after the first terminal completes registration, the IPTV network determines the corresponding terminal context information based on the address information of the first terminal, and sends the plurality of pieces of terminal context information to the PCF. The PCF then sends the plurality of pieces of terminal context information and the corresponding terminal identifiers to the UPF. The UPF performs, based on the plurality of pieces of terminal context information, session management on the terminals indicated by the corresponding terminal identifiers, so that the plurality of pieces of terminal context information can be simultaneously sent to the UPF. This improves efficiency of sending the terminal context information.

Figure 7:
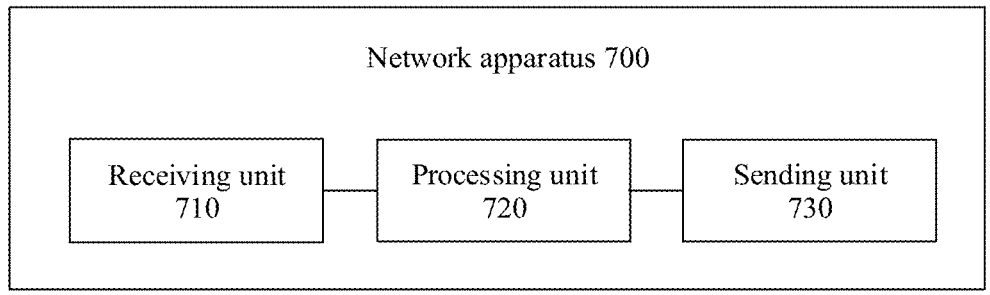
FIG. 7 is a schematic block diagram of a network apparatus according to an embodiment of this application.

FIG. 7 is a schematic block diagram of a network apparatus according to an embodiment of this application. The network apparatus 700 includes a receiving unit, a processing unit, and a sending unit.

The receiving unit 710 is configured to receive a first message from a second core network element, where the first message includes identification information of a first terminal and first identification information of a session, and the session indicated by the first identification information is used by a second terminal to transmit data for the first terminal.

The processing unit 720 is configured to obtain, based on the identification information of the first terminal, terminal context information corresponding to the session. The sending unit 730 is configured to send a second message to the second core network element, where the second message includes the terminal context information corresponding to the session.

In a possible embodiment, the second message further includes second identification information of the session. The second identification information of the session may be the same as or different from the first identification information. The first identification information may be any identifier that identifies the session, including any one piece of information that identifies the session, such as a PDU session identifier, an N4 session identifier, an IP address assigned to a PDU session, and a policy association identifier (Policy Association ID). The second identification information may be any identifier that identifies the session, including any one piece of information that identifies the session, such as a PDU session identifier, an N4 session identifier, an IP address assigned to a PDU session, and a policy association identifier (Policy Association ID).

In a possible embodiment, the receiving unit 710 is further configured to:

receive, from a data network, a unified data management network element, or a unified database, terminal context information corresponding to a plurality of terminals.

The processing unit is configured to:

obtain, based on the identification information of the first terminal, the terminal context information corresponding to the session from the terminal context information corresponding to the plurality of terminals.

In a possible embodiment, the processing unit 720 is configured to:

send a third message to a unified data management network element or a unified database, where the third message includes the identification information of the first terminal; and receive a fourth message from the unified data management network element or the unified database, where the fourth message includes the terminal context information corresponding to the session.

In a possible embodiment, the terminal context information includes at least one of the following information corresponding to the first terminal: multicast permission information, quality of service information, and policy information.

In a possible embodiment, the multicast permission information includes permission used by the first terminal to obtain multicast channel data.

In a possible embodiment, the first core network element includes a policy control network element, and the second core network element includes a session management function.

In a possible embodiment, the first core network element may further include a unified data management network element or a unified database.

In a possible embodiment, the first terminal includes a set-top box, and the second terminal includes user equipment or a residential gateway.

In a possible implementation, that the session is used by a second terminal to transmit data for the first terminal includes: The session is a session used by the first terminal to transmit data via the second terminal.

Figure 8:
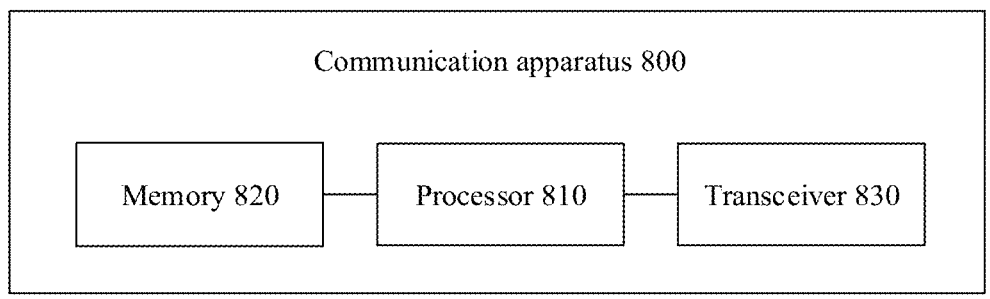
FIG. 8 is a schematic block diagram of a communication apparatus according to an embodiment of this application.
Figure 9:
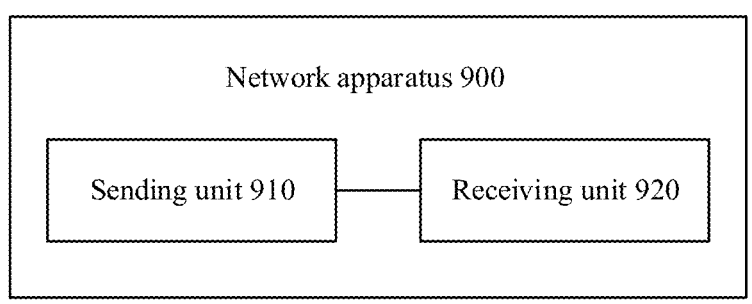
FIG. 9 is a schematic block diagram of a network apparatus according to an embodiment of this application.

As shown in FIG. 8, an embodiment of this application further provides a communication apparatus 800. The communication apparatus 800 includes a processor 810, a memory 820, and a transceiver 830. The memory 820 stores instructions or a program, and the processor 810 is configured to execute the instructions or the program stored in the memory 820. When the instructions or the program stored in the memory 820 are/is executed, the processor 810 is configured to perform an operation performed by the processing unit 720 in the foregoing embodiment, and the transceiver 830 is configured to perform an operation performed by the receiving unit 710 or the sending unit 730 in the foregoing embodiment.

It should be understood that the network apparatus 700 or the communication apparatus 800 according to embodiments of this application may correspond to the first core network device in the communication methods in embodiments of this application. In addition, operations and/or functions of modules in the network apparatus 700 or the communication apparatus 800 are separately used to implement corresponding procedures of the methods in FIG. 2 to FIG. 6. For brevity, details are not described herein again.

An embodiment of this application provides a schematic block diagram of a network apparatus 900. The network apparatus 900 includes a sending unit 910 and a receiving unit 920.

The sending unit 910 is configured to send a first message to a first core network element, where the first message includes identification information of a first terminal and first identification information of a session, and the session indicated by the first identification information is used by a second terminal to transmit data for the first terminal.

The receiving unit 920 is configured to receive a second message from the first core network element, where the second message includes terminal context information corresponding to the session.

The sending unit 910 is configured to send a fifth message to a third core network element, where the fifth message includes the terminal context information corresponding to the session, and the fifth message is used to indicate the third core network element to manage the session based on the terminal context information corresponding to the session.

In a possible embodiment, the receiving unit 920 is further configured to:

receive a session message from the second terminal, where the session message includes the identification information of the first terminal; or receive a DHCP message, where the DHCP message includes the identification information of the first terminal.

In a possible embodiment, the terminal context information includes at least one of the following information corresponding to the first terminal: multicast permission information, quality of service information, and policy information.

In a possible embodiment, the multicast permission information includes permission used by the first terminal to obtain multicast channel.

In a possible embodiment, the first core network element includes a policy control network element, the second core network element includes a session management function, and the third core network element includes a user plane function.

In a possible embodiment, the first core network element may further include a unified data management network element or a unified database.

In a possible implementation, that the session is used by a second terminal to transmit data for the first terminal includes: The session is a session used by the first terminal to transmit data via the second terminal.

Figure 10:
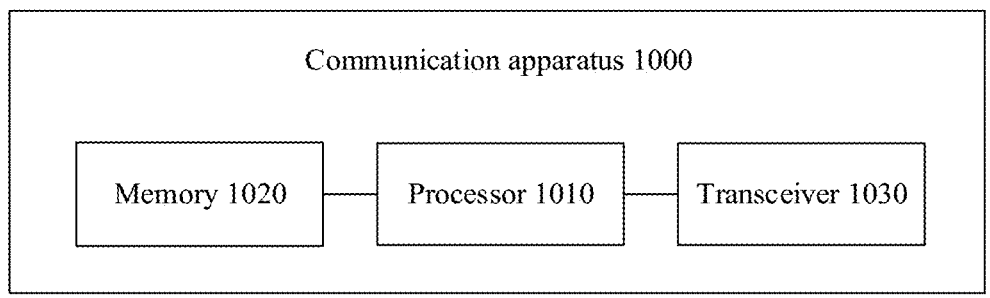
FIG. 10 is a schematic block diagram of a communication apparatus according to an embodiment of this application.

As shown in FIG. 10, an embodiment of this application further provides a communication apparatus 1000. The communication apparatus 1000 includes a processor 1010, a memory 1020, and a transceiver 1030. The memory 1020 stores instructions or a program, and the processor 1010 is configured to execute the instructions or the program stored in the memory 1020. When the instructions or program stored in the memory 1020 are/is executed, the transceiver 1030 is configured to perform an operation performed by the receiving unit 910 or the sending unit 920 in the foregoing embodiment.

It should be understood that the network apparatus 900 or the communication apparatus 1000 according to embodiments of this application may correspond to the second core network device in the communication methods in embodiments of this application. In addition, operations and/or functions of modules in the network apparatus 900 or the communication apparatus 1000 are used to implement corresponding procedures of the methods in FIG. 2 and FIG. 6. For brevity, details are not described herein again.

An embodiment of this application further provides a computer-readable storage medium. The computer-readable storage medium stores a computer program. When the program is executed by a processor, a procedure related to the communication apparatus in the communication methods provided in the foregoing method embodiments may be implemented.

Figure 11:
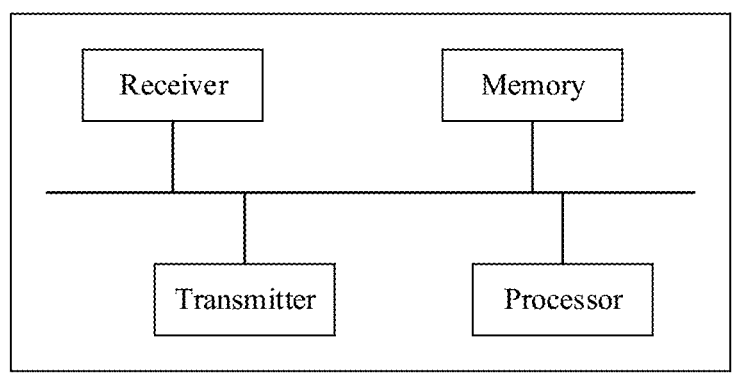
FIG. 11 is a schematic diagram of a hardware structure of a communication apparatus according to an embodiment of this application.

FIG. 11 is a schematic diagram of a hardware structure of a communication apparatus according to an embodiment of this application. The communication apparatus includes a processor, and may further include a receiver, a transmitter, and a memory. The receiver, the transmitter, the memory, and the processor are connected to each other by using a bus.

The memory includes but is not limited to a random access memory (RAM), a read-only memory (ROM), an erasable programmable read-only memory (EPROM), or a compact disc read-only memory (CD-ROM). The memory is configured to store related instructions and related data.

The receiver is configured to receive data and/or a signal, and the transmitter is configured to send data and/or a signal. The transmitter and the receiver may be independent components, or may be an integral component.

The processor may include one or more processors, for example, includes one or more central processing units (CPU). When the processor is one CPU, the CPU may be a single-core CPU, or may be a multi-core CPU.

The memory is configured to store program code and data of the communication apparatus.

The processor is configured to invoke the program code and the data in the memory, to perform the steps in the foregoing method embodiments. For details, refer to the descriptions in the foregoing method embodiments. Details are not described herein again.

It may be understood that FIG. 11 merely shows a simplified design of the communication apparatus. During actual application, the communication apparatus may also include other necessary components, including but not limited to any quantity of transceivers, processors, controllers, memories, and the like, and all communication apparatuses that can implement this embodiment of the present invention shall fall within the protection scope of the present invention.

It should be understood that the communication apparatus in FIG. 11 may correspond to the first core network device or the second core network device in the communication methods in embodiments of this application, and operations and/or functions of the modules in the communication apparatus are separately used to implement corresponding procedures of the methods in FIG. 2 to FIG. 6. For brevity, details are not described herein again.

Figure 12:
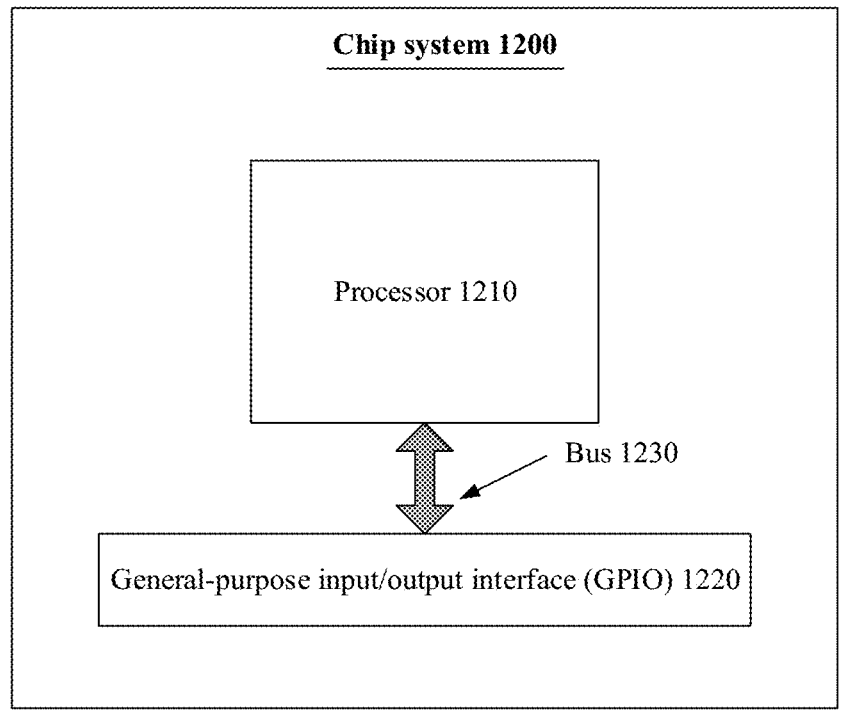
FIG. 12 is a schematic diagram of a structure of a chip system according to an embodiment of this application.

FIG. 12 is a schematic diagram of a structure of a chip system according to an embodiment of this application. As shown in FIG. 12, the chip system 1200 may include a processor 1210 and one or more interfaces 1220 coupled to the processor 1210. An example is as follows:

The processor 1210 may be configured to read and execute computer-readable instructions. During specific implementation, the processor 1210 may mainly include a controller, a calculator, and a register. For example, the controller is mainly responsible for decoding instructions, and sends a control signal for an operation corresponding to the instructions. The arithmetic unit is mainly responsible for performing a fixed-point or floating-point arithmetic operation, a shift operation, a logic operation, and the like, and may also perform an address operation and address translation. The register is mainly responsible for saving a quantity of register operations, intermediate operation results, and the like that are temporarily stored during instruction execution. During specific implementation, a hardware architecture of the processor 1210 may be an application-specific integrated circuit (ASIC) architecture, a microprocessor without interlocked piped stages (MIPS) architecture, an advanced reduced instruction set computing machines (advanced RISC machines, ARM) architecture, an NP architecture, or the like. The processor 1210 may have a single core or a plurality of cores.

For example, the interface 1220 may be configured to input to-be-processed data to the processor 1210, and may output a processing result of the processor 1210. During specific implementation, the interface 1220 may be a general-purpose input/output (GPIO) interface. The interface 1220 is connected to the processor 1210 through a bus 1230.

In a possible implementation, the processor 1210 may be configured to invoke, from the memory, a program or data for implementing, on a network apparatus side, a communication method provided in one or more embodiments of this application, so that the chip system can implement the methods shown in FIG. 2 to FIG. 6. The memory may be integrated with the processor 1210, or may be coupled to the chip system 1200 through the interface 1220. In other words, the memory may be a part of the chip system 1200, or may be independent of the chip system 1200. The interface 1220 may be configured to output an execution result of the processor 1210. In this application, the interface 1220 may be specifically configured to output a decoding result of the processor 1210. For the communication method provided in one or more embodiments of this application, refer to the foregoing embodiments. Details are not described herein again.

It should be noted that a function corresponding to each of the processor 1210 and the interface 1220 may be implemented by using a hardware design, or may be implemented by using a software design, or may be implemented by combining software and hardware. This is not limited herein.

It may be further understood that the memory mentioned in embodiments of this application may be a volatile memory or a nonvolatile memory, or may include a volatile memory and a nonvolatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Sync Link DRAM, SLDRAM), and a direct rambus dynamic random access memory (Direct Rambus RAM, DR RAM).

It should be noted that when the processor is a general-purpose processor, a DSP, an ASIC, an FPGA or another programmable logic device, a transistor logic device, or a discrete hardware component, the memory (a storage module) is integrated into the processor.

An embodiment of this application further provides a communication system. The communication system includes the network apparatus provided in the foregoing embodiments, configured to perform corresponding procedures of the methods in FIG. 2 to FIG. 6.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all embodiments described in the specification are example embodiments, and the related actions and modules are not necessarily mandatory to the present invention.

In the foregoing embodiments, descriptions of embodiments have respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form or another form.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of the present invention essentially, or the part contributing to the prior art, or all or some of the technical solutions may be implemented in the form of a software product. The software product is stored in a memory and includes several instructions for instructing a computer device (which may be a personal computer, a server, or a network device) to perform all or some of the steps of the methods described in embodiments of the present invention. The foregoing memory includes any medium that can store program code, for example, a USB flash drive, a read-only memory (ROM), a random access memory (RAM), a removable hard disk, a magnetic disk, or an optical disc.

A person of ordinary skill in the art may understand that all or some of the steps of the methods in embodiments may be implemented by a program instructing related hardware. The program may be stored in a computer-readable memory. The memory may include a flash memory, a read-only memory (ROM), a random access memory (RAM), a magnetic disk, an optical disc, or the like.

What is claimed is:

1. A communication method, comprising:
receiving, by a first core network element, a first message from a second core network element, wherein the first message comprises identification information of a first terminal and first identification information of a session, and the session indicated by the first identification information is for transmitting data for the first terminal through a second terminal;

obtaining, by the first core network element based on the identification information of the first terminal, terminal context information corresponding to the session; and sending, by the first core network element, a second message to the second core network element, wherein the second message comprises the terminal context information corresponding to the session.

2. The method according to claim 1, wherein the second message further comprises second identification information of the session.

3. The method according to claim 1, further comprising:

receiving, by the first core network element from one of a data network, a unified data management network element, or a unified database, terminal context information corresponding to a plurality of terminals;

wherein the obtaining, by the first core network element based on the identification information of the first terminal, the terminal context information corresponding to the session comprises:

obtaining, by the first core network element based on the identification information of the first terminal, the terminal context information corresponding to the session from the terminal context information corresponding to the plurality of terminals.

4. The method according to claim 1, wherein the obtaining, by the first core network element based on the identification information of the first terminal, the terminal context information corresponding to the session comprises:

sending, by the first core network element, a third message to a unified data management network element or a unified database, wherein the third message comprises the identification information of the first terminal; and receiving, by the first core network element, a fourth message from the unified data management network element or the unified database, wherein the fourth message comprises the terminal context information corresponding to the session.

5. The method according to claim 1, wherein the terminal context information comprises at least one of the following information corresponding to the first terminal: multicast permission information, quality of service information, or policy information.

6. The method according to claim 5, wherein the multicast permission information comprises permission for the first terminal to obtain multicast channel data.

7. The method according to claim 1, wherein the first core network element comprises a policy control network element, and the second core network element comprises a session management function.

8. The method according to claim 1, wherein the first terminal comprises a set-top box, and the second terminal comprises user equipment or a residential gateway.

9. The method according to claim 1, further comprising:

receiving, by the second core network element, the second message from the first core network element; and sending, by the second core network element, a fifth message to a third core network element, wherein the fifth message comprises the terminal context information corresponding to the session, and the fifth message indicates the third core network element to manage the session based on the terminal context information corresponding to the session.

10. A communication apparatus, comprising a processor and a memory, wherein the memory is configured to store computer program instructions, which when executed by the processor, cause the communication apparatus to:

receive a first message from a second core network element, wherein the first message comprises identification information of a first terminal and first identification information of a session, and the session indicated by the first identification information is for transmitting data for the first terminal through a second terminal;

obtain based on the identification information of the first terminal, terminal context information corresponding to the session; and send a second message to the second core network element, wherein the second message comprises the terminal context information corresponding to the session.

11. The communication apparatus according to claim 10, wherein the second message further comprises second identification information of the session.

12. The communication apparatus according to claim 10, wherein the program instructions, which when executed by the processor, further cause the communication apparatus to receive, from one of a data network, a unified data management network element, or a unified database, terminal context information corresponding to a plurality of terminals;

wherein the program instructions, which when executed by the processor, further cause the communication apparatus to obtain, based on the identification information of the first terminal, the terminal context information corresponding to the session from the terminal context information corresponding to the plurality of terminals.

13. The communication apparatus according to claim 10, wherein the program instructions, which when executed by the processor, further cause the communication apparatus to:

send a third message to a unified data management network element or a unified database, wherein the third message comprises the identification information of the first terminal; and receive a fourth message from the unified data management network element or the unified database, wherein the fourth message comprises the terminal context information corresponding to the session.

14. The communication apparatus according to claim 10, wherein the terminal context information comprises at least one of the following information corresponding to the first terminal: multicast permission information, quality of service information, or policy information.

15. The communication apparatus to claim 14, wherein the multicast permission information comprises permission for the first terminal to obtain multicast channel data.

16. The communication apparatus according to claim 10, wherein the communication apparatus is a policy control network element, and the second core network element comprises a session management function.

17. The communication apparatus according to claim 10, wherein the first terminal comprises a set-top box, and the second terminal comprises user equipment or a residential gateway.

18. A communication system, comprising a first core network element and a second core network element, wherein the first core network element comprises a processor and a memory, wherein the memory is configured to store computer program instructions, which when executed by the processor, cause the communication apparatus to:

receive a first message from a second core network element, wherein the first message comprises identification information of a first terminal and first identification information of a session, and the session indicated by the first identification information is for transmitting data for the first terminal through a second terminal;

obtain based on the identification information of the first terminal, terminal context information corresponding to the session; and send a second message to the second core network element, wherein the second message comprises the terminal context information corresponding to the session.

19. The communication system according to claim 18, wherein the second message further comprises second identification information of the session.

20. The communication system according to claim 18, wherein the program instructions, which when executed by the processor, further cause the communication apparatus to receive, from one of a data network, a unified data management network element, or a unified database, terminal context information corresponding to a plurality of terminals;

wherein the program instructions, which when executed by the processor, further cause the communication apparatus to obtain, based on the identification information of the first terminal, the terminal context information corresponding to the session from the terminal context information corresponding to the plurality of terminals.

* * * * *